(12) United States Patent  
Oberinger

(10) Patent No.: US 9,481,454 B2  
(45) Date of Patent: Nov. 1, 2016

(54) LINKING DAMPER SYSTEM FOR A ROTORCRAFT LANDING GEAR

(71) Applicant: AIRBUS HELICOPTERS DEUTSCHLAND GMBH, Donauworth (DE)

(72) Inventor: Oliver Oberinger, Gersheim (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 0 days.

(21) Appl. No.: 14/710,634

(22) Filed: May 13, 2015

(65) Prior Publication Data

US 2015/0329203 A1    Nov. 19, 2015

(30) Foreign Application Priority Data

May 13, 2014    (EP) .................................... 14400036

(51) Int. Cl.
*B64C 25/52* (2006.01)
*B64C 25/62* (2006.01)
*B64C 25/32* (2006.01)

(52) U.S. Cl.
CPC ............. *B64C 25/52* (2013.01); *B64C 25/62* (2013.01); *B64C 2025/325* (2013.01)

(58) Field of Classification Search
CPC ....... B64C 25/00; B64C 25/52; B64C 25/58; B64C 25/64; B64C 25/65; B64C 2025/325; B64C 2025/008
USPC ....................................................... 244/108
See application file for complete search history.

(56) References Cited

U.S. PATENT DOCUMENTS

| | | | | |
|---|---|---|---|---|
| 3,144,223 A | * | 8/1964 | Nichols ................... | B64C 25/52 244/100 R |
| 3,387,802 A | * | 6/1968 | Cruz ....................... | B64C 25/52 244/102 R |
| 3,716,208 A | * | 2/1973 | Fagan ..................... | B64C 25/52 244/108 |
| 4,558,837 A | * | 12/1985 | Mens ...................... | B64C 25/00 244/104 FP |
| 2011/0133378 A1 | | 6/2011 | Dunn | |

FOREIGN PATENT DOCUMENTS

| | | |
|---|---|---|
| CA | 2793576 | 3/2013 |
| EP | 2641831 | 9/2013 |

OTHER PUBLICATIONS

European Search Report for EP 14400036, Completed by the European Patent Office on Dec. 8, 2014, 4 Pages.

* cited by examiner

*Primary Examiner* — Richard G Davis
(74) *Attorney, Agent, or Firm* — Brooks Kushman P.C.

(57) ABSTRACT

A linking system for attaching a cross tube to a skid of a landing gear of a rotorcraft, the linking system comprising a hinge element, means for connecting the hinge element to the cross tube and means for connecting the hinge element to the skid, the hinge element in turn comprising a cross tube-sided part and a skid-sided part able to rotate with respect to one another, a torsion bar spring and a rotary damper element suitable for dissipating a ground resonance excitation energy when the rotation of the cross tube-sided part with respect to the skid-sided part occurs.

20 Claims, 2 Drawing Sheets

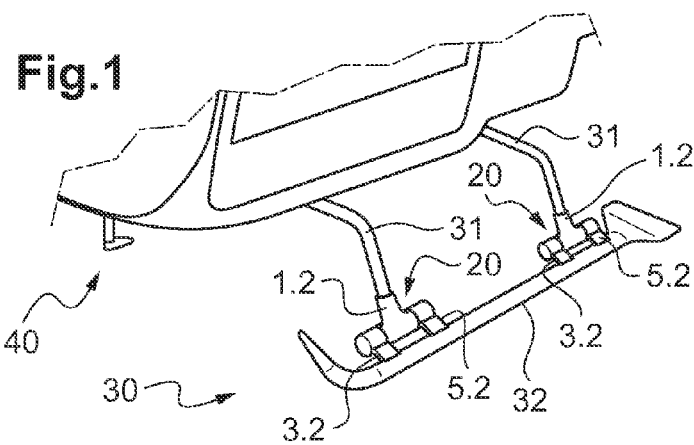
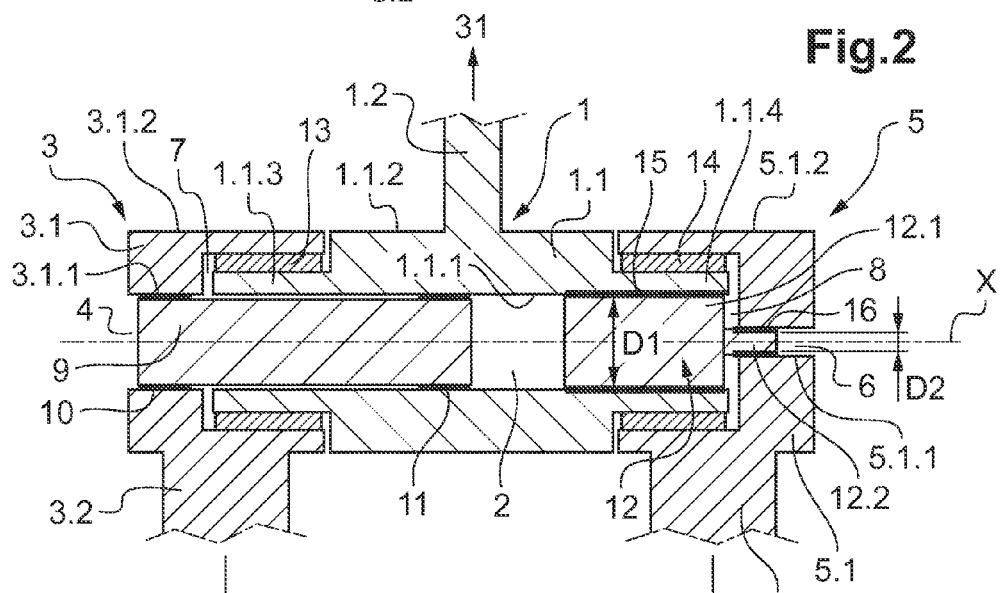
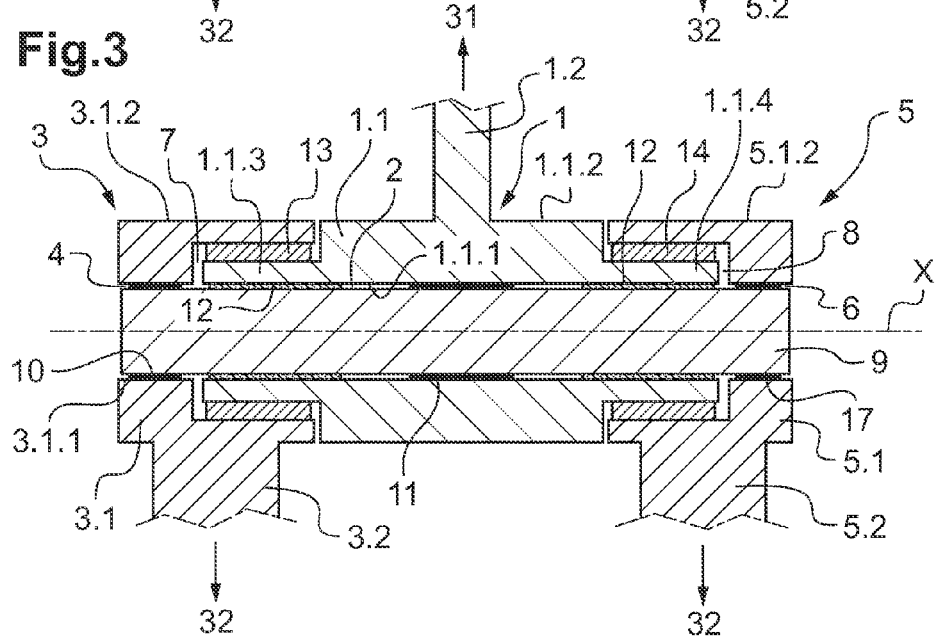

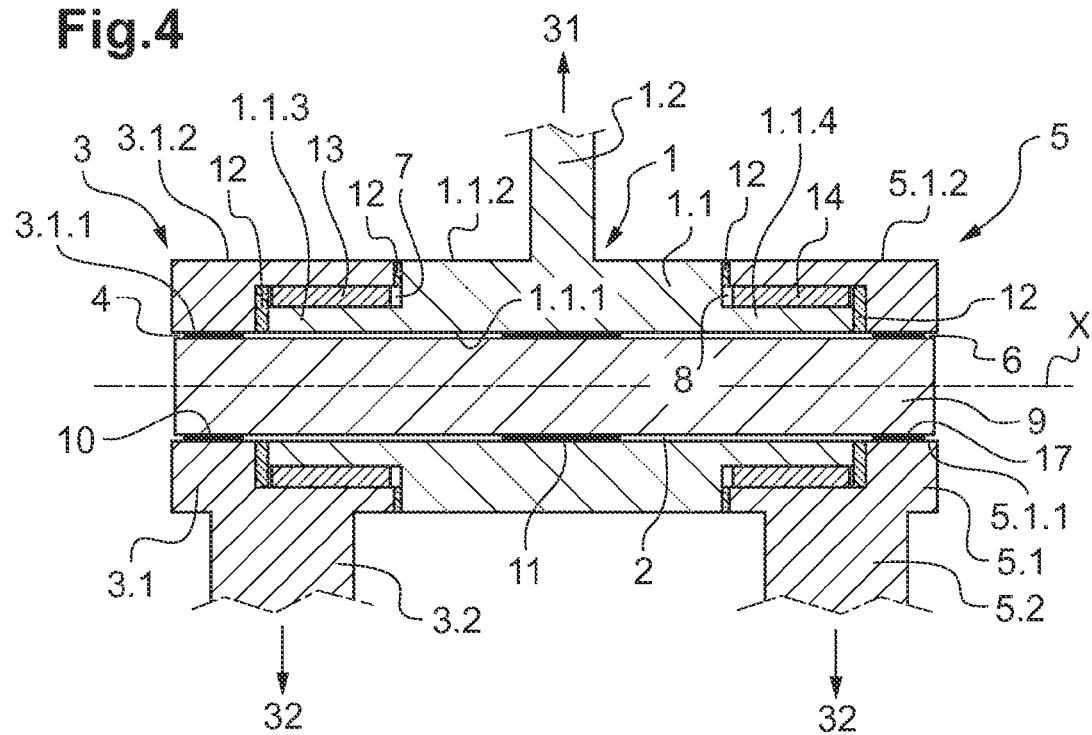
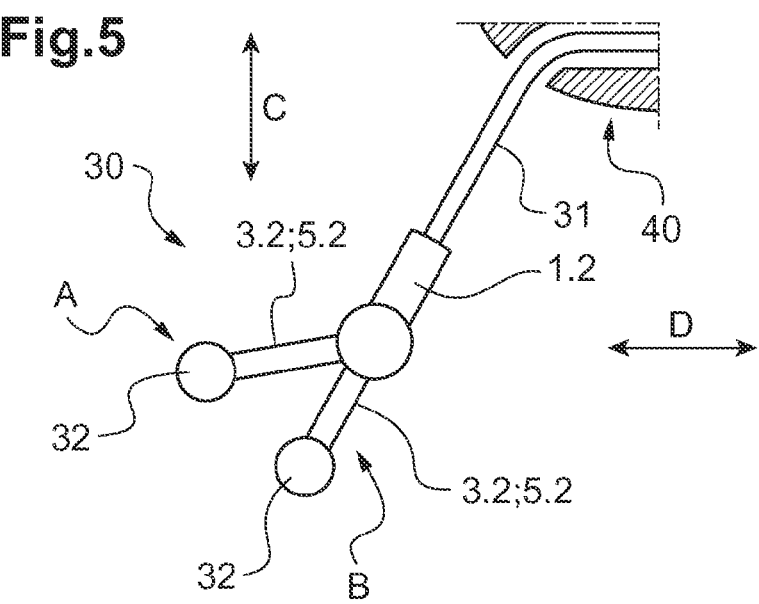

LINKING DAMPER SYSTEM FOR A ROTORCRAFT LANDING GEAR

CROSS REFERENCE TO RELATED APPLICATION

This application claims priority to European patent application No. EP 14 400036.1 filed on May 13, 2014, the disclosure of which is incorporated in its entirety by reference herein.

BACKGROUND OF THE INVENTION (1) Field of the Invention

The present invention relates to a linking system for attaching a cross tube and a skid of a landing gear, the linking system having a hinge arrangement and being suitable for the dissipation of oscillations derived from the ground resonance phenomenon.

(2) Description of Related Art

Conventionally, a rotorcraft has a landing gear on which the aircraft stands when on the ground. More particularly, skid landing gears are provided with two skids extending parallel to the longitudinal direction of the rotorcraft. The skids are for coming into contact with the ground and they are arranged on either side of the fuselage of the rotorcraft.

Furthermore, skid landing gears are usually provided with cross tubes transversally connecting each of the skids to one another and to the fuselage of the aircraft. The landing gear is thus fastened to the aircraft via the cross tubes.

This type of landing gear is very effective and enables a rotorcraft to land on numerous types of surface.

A rotorcraft having at least three hinged blades may be subjected to a phenomenon of ground resonance.

The oscillations of each blade about its lead-lag axis can become coupled in unstable manner with movements of the fuselage of the rotorcraft that depend on the elastic deformation modes of the landing gear. This is at the origin of the ground resonance phenomenon.

As they rotate, the blades move away from their equilibrium positions and can thus become distributed non-uniformly. This non-uniform distribution of the blades gives rise to unbalance, since the center of gravity of the rotor moves away from the axis of rotation of the rotor. Furthermore, blades that are offset from their equilibrium positions oscillate about those equilibrium positions at an oscillation frequency $\omega_\delta$. If $\Omega$ is the frequency of rotation of the rotor, the fuselage of the rotorcraft is excited at two frequencies $|\Omega \pm \omega_\delta|$.

When standing on the ground on the landing gear, the rotorcraft fuselage may be thought of as a mass system that is supported by a spring and a damper constituted by the downward branches of the cross tubes. Such system would be characterized by its modes of vibration, especially in roll and in pitching. There is a potential coupling of frequencies when the frequency of the fuselage in roll or in pitching comes close to the frequency of oscillation $|\Omega + \omega_\delta|$ or $|\Omega + \omega_\delta|$, either during take-off, when the frequency of the rotor $\Omega$ increases, or during landing, when the frequency of the rotor $\Omega$ decreases. In practice, only the frequency $|\Omega + \omega_\delta|$, which could be referred to as regressive frequency, supposes a danger of instability when a rotorcraft stands on the ground. In other words, it is the coupling of the frequency of the fuselage with the regressive frequency of oscillation $|\Omega + \omega_\delta|$ that can bring about the instability phenomenon known as ground resonance.

In order to avoid such instability, the ground resonance phenomenon can be mitigated by introducing a certain amount of damping in the rotorcraft. There are different options for the location of a damping device—either in the structure of the rotor, like the so called lead-lag dampers, or associated to the fuselage, preferably installed at a landing gear level.

In the case the damper device is associated to the landing gear structure, the adaptation of the landing gear is normally complex. For instance, a compromise needs to be found between the vertical stiffness of the landing gear, which determines the comfort and also the loading imparted to the structure when landing, and the behavior in pitching and in roll when the ground resonance oscillations can occur. Besides, the incorporation of damping parts is often prejudicial for the aerodynamic efficiency, the weight of the rotorcraft and the compactness of the structure.

The design of a skid landing gear is, in consequence, a generally lengthy and difficult process. This design is rarely reviewed during the lifetime of an aircraft.

Some prior art documents describe this type of landing gear dampers intended for alleviating the ground resonance.

Document EP2641831 describes a damping system comprising a torsion bar spring extending in the longitudinal direction of the fuselage and going through two floating bearings and through a fixed bearing attached to the fuselage, and further comprising discrete dampers located between the ends of the torsion bar spring and the fuselage.

Document US 2011/0133378 A1 teaches a damping device suitable for its connection between the cross tube of a landing gear and the fuselage of a helicopter. The device comprises a barrel in turn having a cavity such that a compression member can move inside the cavity defining one hydraulic cavity at each side of the piston, one of them having a hydraulic fluid and a disc of springs, and the other having an additional spring that controls the linear movement of the piston relative to the barrel.

U.S. Pat. No. 3,716,208 discloses a landing gear having a system for dissipating energy located within the structure of the landing gear. The dissipation takes place thanks to liquid springs having one end connected to a skid and another one connected to a crank in turn linked to the cross tube.

Other prior art documents disclose vibration absorbers for the main excitation frequencies of a helicopter—they are thus not specifically designed for dealing with the instability derived from the ground resonance. For instance, document CA2793576 A1 discloses the arrangement of a spring mass system mounted on the landing gear, located at its antinodes and tuned to the helicopter's main excitation frequency.

BRIEF SUMMARY OF THE INVENTION

The present invention aims at providing a damping device capable of mitigating the effects a hypothetical ground resonance phenomenon while limiting the interference with the design of the rotorcraft, that is, without the need for additional attachment points to the fuselage. Moreover, the present invention looks to provide efficient damping in any selected direction.

To achieve that, the present invention claims a linking system for attaching a cross tube to a skid of a landing gear of a rotorcraft, the linking system comprising a hinge element, cross tube attaching means suitable for connecting the hinge element to the cross tube and skid attaching means suitable for connecting the hinge element to the skid, the hinge element in turn comprising:

a cross tube-sided part attached to the cross tube attaching means and a skid-sided part attached to the skid attaching means, the cross tube-sided part and the skid-sided part being linked by at least one bearing element suitable for allowing a relative rotation between the cross tube-sided part and the skid-sided part, a torsion bar spring rigidly connected to both the at least one cross tube-sided part and the at least one skid-sided part, at least one rotary damper element suitable for dissipating a ground resonance excitation energy when the rotation of the cross tube-sided part with respect to the skid-sided part occurs.

The inventive linking system is suitable for its installation between a cross tube of a landing gear of a rotorcraft and a skid of the landing gear.

The claimed linking system comprises cross tube attaching means and skid attaching means. The cross tube attaching means are able to link the part of the hinge element referred to as cross tube-sided part to the cross tube itself. The cross tube attaching means extend longitudinally in a direction that is substantially parallel to the longitudinal direction of the extreme of the cross tube fitting in the cross tube attaching means.

The skid attaching means are able to link the part of the hinge element referred to as skid-sided part to skid of the landing gear. The cross tube attaching means extend longitudinally in a direction that is substantially perpendicular to the longitudinal direction of the skid fitting in the skid attaching means.

When the regressive frequency of oscillations, $|\Omega+\omega_\delta|$, substantially crosses the value of the frequency of the fuselage in roll or in pitching, the ground resonance phenomenon may possibly appear and there are, potentially, oscillations either in pitch or in roll. Consequently, there is a risk of a phenomenon of instability and then of destruction of the rotorcraft. The hinged configuration of the present invention is advantageously arranged to mitigate the oscillations.

The oscillations cause a moment around the hinge element which depends on the length of the skid attaching means, that is, on the distance between the axis of the skid of the landing gear and the axis of rotation of the hinge element. Such moment, together with the hinged configuration of the hinge element, results in a relative hinge angular velocity between the cross tube-sided part and the skid-sided part. This relative rotational movement is allowed and controlled by means of an at least one bearing element linking the cross tube-sided part and the skid-sided part.

In particular examples, the at least one bearing element is a needle bearing, a roller bearing, a ball bearing or an elastomeric bearing.

The system comprises at least one rotary damper element. A rotary damper element dissipates energy when it is located between two parts having a rotational relative movement. In some embodiments, the at least one rotary damper element is made of elastomeric material.

The hinge element further comprises a torsion bar spring, suitable for storing the potential energy to be dissipated by the rotary damper element and rigidly connected to both the at least one cross tube-sided part and the at least one skid-sided part. The potential energy to be stored depends on the restoring moment of the torsion bar spring, which is in turn a function of the stiffness of the torsion bar spring and therefore of the elastic deformation in twisting between two rigid connections. If the stiffness is too high, the relative rotational movement is impeded; contrarily, if the stiffness is too low, the restoring moment is not sufficient to dissipate a significant amount of energy.

The at least one rotary damper element can then be located between the cross tube-sided part and the skid-sided part, or between the torsion bar spring and any of the cross tube-sided part and the skid-sided part.

The claimed invention presents the advantage of being able to dissipate oscillations in different directions that can be selected by adjusting the relative directions in which the cross tube skid attaching means longitudinally extend. As an example, for dissipating oscillations mainly in a direction parallel to the axis of rotation of the rotor of the rotorcraft, the skid attaching means are longitudinally aligned in a direction substantially perpendicular to a vertical mid-plane extending longitudinally along the fuselage of the rotorcraft. As a result, the moment on the skid attaching means around the axis of rotation of the hinge is higher, yielding the desired hinge angular velocity between the at least one cross tube-sided part and the at least one skid-sided part that in turn leads to a better dissipation of the oscillation in the at least one rotary damper element.

Likewise, for oscillations in a direction perpendicular to a vertical mid-plane of the rotorcraft, the skid attaching means are longitudinally aligned in a direction substantially parallel to the direction along which the cross tube attaching means extends. Following the same line of reasoning as in the above case, that configuration would increase the moment around the axis of rotation of the hinge element, and in consequence the hinge angular velocity would be that resulting in a proper dissipation of the oscillations originated by the ground resonance.

The present invention is also advantageous in that it does not require major modifications in the configuration of existing landing gears. It achieves the damping of the ground resonance oscillations by its installation between conventional cross tubes and skids of a landing gear. Besides, its integrated and compact design is aerodynamically and visually beneficial.

The linking system does also permit an easy adaptation to a great range of values of ground resonance frequencies to be damped. Varying the distance between the axis of the skid and the axis of the hinge element and the rotation allowed by the at least one bearing element, the hinge angular velocity, from which the dissipation depends, can be controlled. For a given value of the frequency that characterizes the ground resonance phenomenon, the damping coefficient of the at least one rotary damper element can also be selected to provide the required dissipation.

In an embodiment, the linking system comprises a hinge element wherein:

the skid attaching means comprise first lateral attaching means and second lateral attaching means, the at least one bearing element comprises a first bearing element and a second bearing element, the skid-sided part comprises:

a first lateral annular hollow part extending longitudinally along a longitudinal axis (X) and extending radially between a first lateral internal periphery and a first lateral external periphery, the first lateral internal periphery defining a first lateral cylindrical cavity, the longitudinal axis (X) being the axis of symmetry of said first lateral cylindrical cavity, and the first lateral external periphery being secured to the first lateral attaching means, a second lateral annular hollow part extending longitudinally along the longitudinal axis and extending radially between a second lateral internal periphery and a second lateral external periphery, the second lateral internal periphery defining a second lateral cylindrical cavity, the longitudinal axis being the axis of symmetry of said second lateral cylindrical cavity, and the second lateral external periphery being secured to the second lateral attaching means, the cross tube-sided part is an annular hollow part extending longitudinally along the longitudinal axis (X) and extending radially between a central internal periphery and a central external periphery, the central internal periphery defining a central cylindrical cavity, the longitudinal axis (X) being the axis of symmetry of said central cylindrical cavity, and the central external periphery being secured to the cross tube attaching means, the cross tube-sided part being located longitudinally between the first lateral annular hollow part and the second lateral annular hollow part, the first lateral annular hollow part and the cross tube-sided part being connected by means of the first bearing element located inside a first slot defined between said first lateral annular hollow part and said cross tube-sided part, and the second lateral annular hollow part and the cross tube-sided part being connected by means of the second bearing element located inside a second slot defined between said second lateral annular hollow part and said cross tube-sided part, a main cylindrical cavity comprises successively the first lateral cylindrical cavity, the central cylindrical cavity and the second lateral cylindrical cavity, the torsion bar spring is a cylindrical torsion bar spring located inside the main cylindrical cavity, the longitudinal axis (X) being the axis of symmetry of said cylindrical torsion bar spring, a first lateral annular connecting element rigidly joins the cylindrical torsion bar spring with the first lateral annular hollow part, said first lateral annular connecting element having the longitudinal axis (X) as axis of symmetry, a central annular connecting element rigidly joins the cylindrical torsion bar spring with the cross tube-sided part, said central annular connecting element having the longitudinal axis (X) as axis of symmetry, the at least one rotary damper element is located inside an internal volume, said internal volume formed by the main cylindrical cavity, the first slot and the second slot.

The skid-sided part of the hinge element, in this embodiment, comprises two lateral pieces, referred to as first lateral annular hollow part and second lateral annular hollow part, one at each longitudinal side of the cross tube-sided part and separated from such cross tube-sided part, respectively, by a first slot and a second slot.

The first lateral annular hollow part, the cross tube-sided part and the second lateral annular hollow part extend successively, in their longitudinal direction, along a longitudinal axis (X), which is the axis of rotation of the hinge element in this embodiment. They are annular parts, that is, ring-shaped parts defining internal cavities. The first internal periphery of the first annular hollow part defines a first lateral cylindrical cavity; the central internal periphery of the cross tube-sided part defines a central cylindrical cavity and the second lateral internal periphery of the second lateral hollow part defines a second lateral cylindrical cavity. The cylindrical cavities have the axis (X) as axis of symmetry.

In this embodiment, the skid attaching means comprise first lateral attaching means and second lateral attaching means. The first lateral attaching means are secured to the first lateral external periphery of the first lateral annular hollow part, and the second lateral attaching means are secured to the second lateral external periphery of the second lateral annular hollow part. The cross tube attaching means are secured to the central external periphery of the cross tube-sided part.

The at least one bearing element comprises a first bearing element located in the first slot that allows and directs the relative rotational movement between the first lateral annular hollow part and the cross tube-sided part, and a second bearing element located in the second slot that allows and directs the relative rotational movement between the second lateral annular hollow part and the cross tube-sided part. The relative rotational movement between the first annular hollow part and the cross tube-sided part is the same as the relative motion between the second lateral annular hollow part and the cross tube-sided part, thus permitting the uniform hinge movement of the hinge element.

In this embodiment, the torsion bar spring is a cylindrical torsion bar spring located inside the main cylindrical cavity formed by the first lateral cylindrical cavity, the central cylindrical cavity and the second lateral cylindrical cavity, the torsion bar spring being attached to the first lateral internal periphery of the first lateral annular hollow part by the first lateral annular connecting element and being attached to the second lateral internal periphery of the second lateral annular hollow part by the second lateral annular connecting element.

The first and second slots and the main cylindrical cavity form an internal volume of the hinge element. In this embodiment, the at least one rotary damper element is located inside the internal volume, thus contributing to the compact and aerodynamically efficient design of the linking system.

In a further embodiment, the cross tube-sided part successively comprises, along the longitudinal direction, an annular first end body, an annular central body and an annular second end body, the annular first end body being arranged to fit the first lateral annular hollow part forming the first slot, and the annular second end body being arranged to fit the second lateral annular hollow part forming the second slot.

The radius of the central external periphery in the annular first and second end bodies is, in an embodiment, smaller than the radius of the central external periphery in the annular central body. Thus, the annular central body and the annular first and second end bodies define a housing suitable for the fitting of the first and second annular hollow parts.

In a further embodiment, the first lateral external periphery, the central external periphery in the annular central body and the second lateral external periphery are flush. As a result, the configuration of the linking device is even more aerodynamically efficient.

In another embodiment, the first bearing element and the second bearing element have annular form, the longitudinal axis (X) being the axis of symmetry of said first and second bearing elements.

The at least one rotary damper element can adopt many different configurations, as long as it is located between, and in contact with, two elements able to rotate with respect to one another. Such direct contact can be forced by just pressing the at least one rotary damper element between the two elements able to rotate or, for example, by using splines.

In an embodiment, the at least one rotary damper element comprises, successively along the longitudinal direction, a first cylindrical damper part and a second cylindrical damper part, both located in the main cylindrical cavity, the first cylindrical damper part being linked to the cross tube-sided part by means of a first annular rigid connection and the second cylindrical damper part being linked to the second lateral annular hollow part by means of a second annular rigid connection, the longitudinal axis (X) being the axis of symmetry of said first and second cylindrical damper parts.

The dissipation is achieved, in this case, by the relative rotation between the first cylindrical damper part and the second cylindrical damper part. Since the first cylindrical damper part is linked to the cross tube-sided part by means of the first annular rigid connection, and the second cylindrical damper part is linked to the second lateral annular hollow part by means of the second annular rigid connection, it is in turn the relative rotational movement between the cross tube-sided part and the second lateral annular hollow part that forces the two parts of the rotary damper element to rotate.

In an example of this embodiment, the first cylindrical damper part and the second cylindrical damper part have a circular cross section, the first cylindrical damper part having a first diameter and the second cylindrical damper part having a second diameter, the first diameter being bigger than the second diameter.

The difference of diameters helps to the relative rotation of the first cylindrical damper part and the second cylindrical damper part.

Furthermore, that of circular cross section is a preferred configuration for the first and second cylindrical damper parts of this embodiment and also for other components of the hinge element, since it is the configuration that allows an easier rotation. In particular, in a preferred embodiment, the torsion bar spring, the first lateral cylindrical cavity, the central cylindrical cavity and the second lateral cylindrical cavity are cylinders having circular cross sections, whereas the first and second lateral annular hollow parts, the cross tube-sided part and the first and second bearing elements are annular volumes having circular crown cross sections.

In another embodiment, the linking system further comprises a second lateral annular connecting element rigidly joining the cylindrical torsion bar spring with the second lateral annular hollow part, said second lateral annular connecting element having the longitudinal axis (X) as axis of symmetry.

The torsion bar spring of this embodiment occupies the majority of the main cylindrical cavity, as it is rigidly joined to the first lateral annular hollow part, to the cross tube-sided part and to the second lateral annular hollow part.

In a preferred embodiment, the annular connecting elements have a circular crown cross section.

In one of the embodiments wherein the torsion bar spring occupies the majority of the main cylindrical cavity, the at least one rotary damper element includes two rotary damper elements of annular form, the longitudinal axis (X) being the axis of symmetry of said two rotary damper elements, each rotary damper element being attached to the cross tube-sided part and to the torsion bar spring, and each rotary damper element being, longitudinally, on a different side of the central annular connecting element.

In this embodiment, there are two rotary damper elements radially located between, and in contact with, the torsion bar spring and the cross tube-sided part. In the longitudinal direction of the hinge element, one of the rotary damper elements is located between the first lateral annular connecting element and the central annular connecting element, and the other rotary damper element is located between the central annular connecting element and the second lateral annular connecting element.

Since the annular connecting elements rigidly join the torsion bar spring with the first lateral annular hollow part, the cross tube-sided part and the second lateral annular hollow part, the longitudinal location of the rotary damper elements of this embodiment is preferably as far as possible from the connecting elements, to take advantage of the higher relative rotation between the torsion bar spring and the cross tube-sided part and thus provide a higher dissipation of ground resonance oscillations.

In yet another embodiment wherein the torsion bar spring occupies the majority of the main cylindrical cavity, the at least one rotary damper element comprises a plurality of rotary damper elements located in the first and second slots.

In this embodiment, the rotary damper elements are located between, and in contact with, the cross tube-sided part and the first lateral annular hollow part and between the cross tube-sided part and the second lateral annular hollow part. The relative rotational movement between the cross tube-sided part and the first lateral annular hollow part and between the cross tube-sided part and the second lateral annular hollow part, controlled respectively by the first and the second bearing elements, cause the deformation of the rotary damper elements that makes the dissipation possible.

The above embodiments having the rotary damper elements either around the torsion bar spring in the main cylindrical cavity or in the first and second slots allow the introduction of damping in systems in which the layout of the torsion bar spring is symmetrical in longitudinal terms and wherein the torsion bar spring occupies the majority of the main cylindrical cavity. With such arrangement, the use of many state-of-the-art damping devices, like certain hydraulic dampers, is not easily applicable since they would obstruct the rotation center where the torsion bar spring is located.

In an embodiment, the plurality of rotary damper elements located in the first and second slots have annular form, the longitudinal axis (X) being the axis of symmetry of said plurality of rotary damper elements. In an example of this embodiment, the plurality of rotary damper elements have circular crown cross sections.

The present invention is also extensive to a landing gear comprising the inventive linking system, and to a rotorcraft, for example a helicopter, in turn comprising such landing gear. The inventive landing gear comprises two cross tubes suitable for its attachment to the fuselage, two skids extending longitudinally parallel to the longitudinal direction of the rotorcraft and at least two linking systems linking an end of the cross tube, by means of the cross tube attaching means, to the skid, by means of the skid attaching means. In an embodiment, the landing gear comprises two linking systems, such that one cross tube is attached to the skids by means of the claimed linking systems and the other cross tube is attached to the skids in a conventional manner. In another embodiment, the landing gear comprises four linking systems, and the two cross tubes are attached to the skids by means of the inventive linking system. In the embodiments wherein the skid-sided part comprises first and second lateral annular hollow parts, the skid attaching means comprise first and second lateral attaching means so that each linking system has two attachments to the corresponding skid.

The present invention additionally discloses a method for the dissipation of ground resonance oscillations in a rotorcraft, the method comprising the following steps:

attaching an inventive linking system to a cross tube, via cross tube attaching means, and to a skid, via skid attaching means, allowing, by means of the at least one bearing element, the relative rotation between the cross tube-sided part and the skid-sided part when the ground resonance oscillations occur, dissipation of the ground resonance oscillations by means of the deformation of the at least one rotary damper element forced by the relative rotation between the cross tube-sided part and the skid-sided part.

In order to dissipate as much of the ground resonance oscillations as possible, the relative position between the directions along which the skid attaching means and the cross tube attaching means respectively extend can be adjusted so that the step of the relative rotation between the cross tube-sided part and the skid-sided part when the ground resonance oscillations occur takes place at the convenient hinge angular velocity, as explained above in the description.

BRIEF DESCRIPTION OF THE SEVERAL VIEWS OF THE DRAWINGS

These and other features and advantages of the invention will become more evident from the following detailed description of preferred embodiments, given only by way of illustrative and non-limiting example, in reference to the attached figures:

FIG. 1 represents a side perspective view of a rotorcraft having a landing gear in which the skids and the cross tubes are linked by means of the inventive linking device.

FIG. 2 depicts a longitudinal sectional view of an embodiment of the linking device wherein the torsion bar spring is linked to the first annular hollow part and to the cross tube-sided part.

FIG. 3 shows a longitudinal sectional view of an embodiment of the linking device wherein the torsion bar spring is linked to the first lateral annular hollow part, to the cross tube-sided part and to the second lateral annular hollow part, and wherein the at least one rotary damper element is located around the torsion bar spring in the main cylindrical cavity.

FIG. 4 shows a longitudinal sectional view of an embodiment of the linking device wherein the torsion bar spring is linked to the first lateral annular hollow part, to the cross tube-sided part and to the second lateral annular hollow part, and wherein the at least one rotary damper element is located in the first and second slots.

FIG. 5 is an schematic representation of two positions of the skid attaching means to provide damping of ground resonance oscillations in two different directions.

DETAILED DESCRIPTION OF THE INVENTION

FIG. 1 represents a rotorcraft 40 having a skid landing gear 30, each of the two skids 32 of the landing gear 30 extending parallel to the longitudinal direction of the rotorcraft 40 and being attached to the cross tubes 31 by inventive linking systems 20. The cross tubes 31 are in turn attached to the fuselage of the rotorcraft 40.

In this embodiment, each one of the two skids 32 is linked to two cross tubes 31 via two linking systems 20, and each linking system 20 has one attachment to the cross tube 31 via the cross tube attaching means 1.2 and two attachment to the skid 32 via the first 3.2 and second 5.2 lateral attaching means.

FIG. 2 depicts a longitudinal section of a linking system 20 having the torsion bar spring 9 located in the main cylindrical cavity 2, 4, 6, rigidly attached by first lateral 10 and central 11 annular connecting elements to the first lateral annular hollow part 3 and to the cross tube-sided part 1. The rotary damper element 12 is linked to the cross tube-sided part 1 by means of the first annular rigid connection 15 and to the second lateral annular hollow part 5 by means of a second annular rigid connection 16.

In the embodiment of FIG. 2, the parts of the hinge element have circular or circular crown cross sections. In particular, the rotary damper element 12 is formed by a first cylindrical damper part 12.1 and by a second cylindrical damper part 12.2 having circular cross sections, the first cylindrical damper part 12.1 having a first diameter D1 and the second cylindrical damper 12.2 part having a second diameter D2. The first diameter D1 is bigger than the second diameter D2, and the difference of diameters permits a relative twist between the first cylindrical damper part 12.1 and the second cylindrical damper part 12.2 when the hinge element rotates.

The rotation of the hinge element is allowed and directed by the first bearing element 13 and by the second bearing element 14. A determined oscillation frequency resulting from the ground resonance phenomenon makes the first 3 and second 5 lateral annular hollow parts rotate with respect to the cross tube-sided part 1.

In the examples of FIGS. 2, 3 and 4, the cross tube-sided part 1 comprises an annular first end body 1.1.3, an annular central body 1.1 and an annular second end body 1.1.4, the annular first end body 1.1.3 being arranged to fit the first lateral annular hollow part 3, thus forming the first slot 7, and the annular second end body 1.1.4 being arranged to fit the second lateral annular hollow part 5, thus forming the second slot 8. The maximum diameter of the annular first end body 1.1.3 and of the annular second end body 1.1.4 is smaller than the maximum diameter of the annular central body 1.1. Consequently, two housings with L-shaped longitudinal sections are formed to receive the first 3 and second 5 lateral annular hollow parts.

In the embodiments of these figures, the slots 7, 8 have three stages, as a result of the shape of the annular first 1.1.3 and second 1.1.4 end bodies. In the reference of the figures, and in the section represented in such figures, two stages extend vertically and the other one extends horizontally. The stages extending horizontally in the section depicted in FIGS. 2, 3 and 4 house the first 13 and second 14 bearings in these embodiments.

In the embodiment of FIG. 4, each of the stages extending vertically in the section depicted in the figure houses the at least one rotary damper element 12.

In the embodiments of FIGS. 2, 3 and 4, the first 3.1.2 and second 5.1.2 lateral external periphery of the first 3 and second 5 lateral annular hollow part and the central external periphery 1.1.2 of the central annular body 1.1 of the cross tube-sided part 1 are flush to improve the aerodynamics of the linking element 20.

In these embodiments, the cross tube attaching means 1.2 are linked to the central external periphery 1.1.2, and the skid attaching means 3.2, 5.2 comprise first lateral attaching means 3.2, linked to the first lateral external periphery 3.1.2, and second lateral attaching means 5.2, linked to the second lateral external periphery 5.1.2

The first 3.1.1 and second 5.1.1 lateral internal periphery and the central 1.1.1 external periphery define, respectively, the first 4 and second 6 lateral cylindrical cavity and the central cylindrical cavity 2.

In the embodiments of FIGS. 3 and 4, the torsion bar spring 9 occupies the majority of the main cylindrical cavity 2, 4, 6, as it is rigidly attached by a second lateral annular connecting element 17 to the second lateral internal periphery 5.1.1 of the second lateral annular hollow part 5.

In the embodiment of FIG. 3, the rotary damper elements 12 are located around the torsion bar spring 9, in contact with the torsion bar spring 9 and with the central internal periphery 1.1.1. Longitudinally, there is one rotary damper element 12 between the first lateral annular connecting elements 10 and the central annular connecting element 11 and another between the central annular connecting element 11 and the second lateral annular connecting element 17.

In FIG. 4, the rotary damper elements 12 are located in the first 7 and second 8 slots. In the reference of the figure, the depicted sections of the rotary damper elements 12 are within the two the vertical stages of the represented sections of the first 7 and second 8 slots. Therefore, this embodiment discloses four annular rotary damper elements 12 having the longitudinal axis (X) as axis of symmetry.

FIG. 5 shows two different configurations of the relative resting position—that is, the position when the hinge element is not rotated—of the longitudinal direction along which the skid attaching means 3.2, 5.2 extend with respect to the longitudinal position in which the cross tube attaching means 1.2 extend.

The first resting position A is suitable for the dissipation of first ground resonance oscillations C oriented mainly in the vertical direction of the reference of the figure. Since the skid attaching means 3.2, 5.2 and the direction of the of first ground resonance oscillations C form an angle close to 90 degrees in the resting position, the moment around the axis of the hinge element is higher, higher is the relative rotation between the cross tube-sided part 1 and the skid-sided part 3, 5 and, in consequence, higher is also the dissipation achieved by the at least one rotary damper element 12. For the very same reasons, the second resting position B is suitable for the dissipation of second ground resonance oscillations D mainly in the horizontal direction of the reference of FIG. 5.

REFERENCE LIST

1.—Cross tube-sided part
1.1.—Annular central body
1.1.1.—Central internal periphery
1.1.2.—Central external periphery
1.1.3.—Annular first end body
1.1.4.—Annular second end body
1.2.—Cross tube attaching means
2.—Central cylindrical cavity
3.—First lateral annular hollow part
3.1.1.—First lateral internal periphery
3.1.2.—First lateral external periphery
3.2.—First lateral attaching means
4.—First lateral cylindrical cavity
5.—Second lateral annular hollow part
5.1.1.—Second lateral internal periphery
5.1.2.—Second lateral external periphery
5.2.—Second lateral attaching means
6.—Second lateral cylindrical cavity
7.—First slot
8.—Second slot
9.—Torsion bar spring
10.—First lateral annular connecting element
11.—Central annular connecting element
12.—Rotary damper element
12.1.—First cylindrical damper part
12.2—Second cylindrical damper part
13.—First bearing element
14.—Second bearing element
15.—First annular rigid connection
16.—Second annular rigid connection
17.—Second lateral annular connecting element
20.—Linking system
30.—Landing gear
31.—Cross tube
32.—Skid
40.—Rotorcraft
A.—First resting position of the skid attaching means
B.—Second resting position of the skid attaching means
C.—First ground resonance oscillations
D.—Second ground resonance oscillations
D1.—Diameter of the first cylindrical damper part
D2.—Diameter of the second cylindrical damper part

What is claimed is:

1. A linking system for attaching a cross tube to a skid of a landing gear of a rotorcraft, the linking system comprising a hinge element, cross tube attaching means suitable for connecting the hinge element to the cross tube and skid attaching means suitable for connecting the hinge element to the skid, the hinge element in turn comprising:

a cross tube-sided part attached to the cross tube attaching means and a skid-sided part attached to the skid attaching means, the cross tube-sided part and the skid-sided part being linked by at least one bearing element suitable for allowing a relative rotation between the cross tube-sided part and the skid-sided part;

a torsion bar spring rigidly connected to both the cross tube-sided part and the skid-sided part; and at least one rotary damper element suitable for dissipating a ground resonance excitation energy when the rotation of the cross tube-sided part with respect to the skid-sided part occurs, wherein the skid attaching means comprise first lateral attaching means and second lateral attaching means;

the at least one bearing element comprises a first bearing element and a second bearing element;

the skid-sided part comprises:

a first lateral annular hollow part extending longitudinally along a longitudinal axis and extending radially between a first lateral internal periphery and a first lateral external periphery, the first lateral internal periphery defining a first lateral cylindrical cavity, the longitudinal axis being the axis of symmetry of the first lateral cylindrical cavity, and the first lateral external periphery being secured to the first lateral attaching means;

a second lateral annular hollow part extending longitudinally along the longitudinal axis and extending radially between a second lateral internal periphery and a second lateral external periphery, the second lateral internal periphery defining a second lateral cylindrical cavity, the longitudinal axis being the axis of symmetry of the second lateral cylindrical cavity, and the second lateral external periphery being secured to the second lateral attaching means;

the cross tube-sided part is an annular hollow part extending longitudinally along the longitudinal axis and extending radially between a central internal periphery and a central external periphery, the central internal periphery defining a central cylindrical cavity, the longitudinal axis being the axis of symmetry of the central cylindrical cavity, and the central external periphery being secured to the cross tube attaching means, the cross tube-sided part being located longitudinally between the first lateral annular hollow part and the second lateral annular hollow part, the first lateral annular hollow part and the cross tube-sided part being connected by means of the first bearing element located inside a first slot defined between the first lateral annular hollow part and the cross tube-sided part, and the second lateral annular hollow part and the cross tube-sided part being connected by means of the second bearing element located inside a second slot defined between the second lateral annular hollow part and the cross tube-sided part;

a main cylindrical cavity comprises successively the first lateral cylindrical cavity, the central cylindrical cavity and the second lateral cylindrical cavity;

the torsion bar spring is a cylindrical torsion bar spring located inside the main cylindrical cavity, the longitudinal axis being the axis of symmetry of the cylindrical torsion bar spring;

a first lateral annular connecting element rigidly joins the cylindrical torsion bar spring with the first lateral annular hollow part, the first lateral annular connecting element having the longitudinal axis as axis of symmetry;

a central annular connecting element rigidly joins the cylindrical torsion bar spring with the cross tube-sided part, the central annular connecting element having the longitudinal axis as axis of symmetry; and the at least one rotary damper element is located inside an internal volume, the internal volume formed by the main cylindrical cavity, the first slot and the second slot.

2. The linking system of claim 1, wherein the cross tube-sided part successively comprises, along the longitudinal direction, an annular first end body, an annular central body and an annular second end body, the annular first end body being arranged to fit the first lateral annular hollow part forming the first slot, and the annular second end body being arranged to fit the second lateral annular hollow part forming the second slot.

3. The linking system of claim 2, wherein the first lateral external periphery, the central external periphery of the annular central body and the second lateral external periphery are flush.

4. A linking system according to claim 3, wherein the first bearing element and the second bearing element have annular form, the longitudinal axis being the axis of symmetry of the first and second bearing elements.

5. A linking system according to claim 4, wherein the at least one rotary damper element comprises, successively along the longitudinal direction, a first cylindrical damper part and a second cylindrical damper part, both located in the main cylindrical cavity, the first cylindrical damper part being linked to the cross tube-sided part by means of a first annular rigid connection and the second cylindrical damper part being linked to the second lateral annular hollow part by means of a second annular rigid connection, the longitudinal axis being the axis of symmetry of the first and second cylindrical damper parts.

6. A linking system according to claim 5, wherein the first cylindrical damper part and the second cylindrical damper part have circular cross sections, the first cylindrical damper part having a first diameter and the second cylindrical damper part having a second diameter, the first diameter being bigger than the second diameter.

7. A linking system according to claim 4, further comprising a second lateral annular connecting element rigidly joining the cylindrical torsion bar spring with the second lateral annular hollow part, the second lateral annular connecting element having the longitudinal axis as axis of symmetry.

8. The linking system of claim 7, wherein the at least one rotary damper element includes two rotary damper elements of annular form, the longitudinal axis being the axis of symmetry of the two rotary damper elements, each rotary damper element being attached to the cross tube-sided part and to the cylindrical torsion bar spring, and each rotary damper element being, longitudinally, on a different side of the central annular connecting element.

9. The linking system of claim 7, wherein the at least one rotary damper element comprises a plurality of rotary damper elements located in the first and second slots.

10. The linking system of claim 9, wherein the plurality of rotary damper elements have annular form, the longitudinal axis being the axis of symmetry of the plurality of rotary damper elements.

11. A landing gear comprising two cross tubes, two skids and at least two linking systems according to claim 1, such linking systems linking an end of the cross tubes to the skid.

12. A rotorcraft comprising a landing gear according to claim 11.

13. A method for the dissipation of ground resonance oscillations in a rotorcraft, the method comprising the following steps:

attaching a linking system according to claim 1 to a cross tube, via cross tube attaching means, and to a skid, via skid attaching means;

allowing, by means of the at least one bearing element, the relative rotation between the cross tube-sided part and the skid-sided part when the ground resonance oscillations occur;

dissipation of the ground resonance oscillations by means of the deformation of the at least one rotary damper element forced by the relative rotation between the cross tube-sided part and the skid-sided part.

14. A linking system for attaching a cross tube to a skid of a landing gear of a rotorcraft, the linking system comprising a hinge element, cross tube attachment suitable for connecting the hinge element to the cross tube and skid attachment suitable for connecting the hinge element to the skid, the hinge element comprising:

a cross tube-sided part attached to the cross tube attachment and a skid-sided part attached to the skid attachment, the cross tube-sided part and the skid-sided part being linked by at least one bearing element suitable for allowing a relative rotation between the cross tube-sided part and the skid-sided part;

a torsion bar spring rigidly connected to both the cross tube-sided part and the skid-sided part; and at least one rotary damper element suitable for dissipating a ground resonance excitation energy when the rotation of the cross tube-sided part with respect to the skid-sided part occurs, wherein the skid attachment comprises first lateral attachment and second lateral attachment;

the at least one bearing element comprising a first bearing element and a second bearing element;

the skid-sided part comprising:

a first lateral annular hollow part extending longitudinally along a longitudinal axis and extending radially between a first lateral internal periphery and a first lateral external periphery, the first lateral internal periphery defining a first lateral cylindrical cavity, the longitudinal axis being the axis of symmetry of the first lateral cylindrical cavity, and the first lateral external periphery being secured to the first lateral attachment;

a second lateral annular hollow part extending longitudinally along the longitudinal axis and extending radially between a second lateral internal periphery and a second lateral external periphery, the second lateral internal periphery defining a second lateral cylindrical cavity, the longitudinal axis being the axis of symmetry of the second lateral cylindrical cavity, and the second lateral external periphery being secured to the second lateral attachment;

the cross tube-sided part being an annular hollow part extending longitudinally along the longitudinal axis and extending radially between a central internal periphery and a central external periphery, the central internal periphery defining a central cylindrical cavity, the longitudinal axis being the axis of symmetry of the central cylindrical cavity, and the central external periphery being secured to the cross tube attachment, the cross tube-sided part being located longitudinally between the first lateral annular hollow part and the second lateral annular hollow part, the first lateral annular hollow part and the cross tube-sided part being connected by the first bearing element located inside a first slot defined between the first lateral annular hollow part and the cross tube-sided part, and the second lateral annular hollow part and the cross tube-sided part being connected by the second bearing element located inside a second slot defined between the second lateral annular hollow part and the cross tube-sided part;

a main cylindrical cavity comprising successively the first lateral cylindrical cavity, the central cylindrical cavity and the second lateral cylindrical cavity;

the torsion bar spring being a cylindrical torsion bar spring located inside the main cylindrical cavity, the longitudinal axis being the axis of symmetry of the cylindrical torsion bar spring;

a first lateral annular connecting element rigidly joins the cylindrical torsion bar spring with the first lateral annular hollow part, the first lateral annular connecting element having the longitudinal axis as axis of symmetry;

a central annular connecting element rigidly joining the cylindrical torsion bar spring with the cross tube-sided part, the central annular connecting element having the longitudinal axis as axis of symmetry; and the at least one rotary damper element being located inside an internal volume formed by the main cylindrical cavity, the first slot and the second slot.

15. The linking system of claim 14, wherein the cross tube-sided part successively comprises, along the longitudinal direction, an annular first end body, an annular central body and an annular second end body, the annular first end body being arranged to fit the first lateral annular hollow part forming the first slot, and the annular second end body being arranged to fit the second lateral annular hollow part forming the second slot.

16. The linking system of claim 15, wherein the first lateral external periphery, the central external periphery of the annular central body and the second lateral external periphery are flush.

17. A rotorcraft according to claim 16, wherein the at least one bearing element comprises a first bearing element and a second bearing element, and wherein the first bearing element and the second bearing element have annular form, the longitudinal axis being the axis of symmetry of the first and second bearing elements.

18. A rotorcraft having a linking system for attaching a cross tube to a skid of a landing gear of the rotorcraft, the linking system comprising a hinge element, cross tube attaching means suitable for connecting the hinge element to the cross tube and skid attaching means suitable for connecting the hinge element to the skid, the hinge element in turn comprising:

a cross tube-sided part attached to the cross tube attaching means and a skid-sided part attached to the skid attaching means, the cross tube-sided part and the skid-sided part being linked by at least one bearing element suitable for allowing a relative rotation between the cross tube-sided part and the skid-sided part;

a torsion bar spring communicating with the cross tube-sided part and the skid-sided part; and at least one rotary damper element suitable for dissipating a ground resonance excitation energy when the rotation of the cross tube-sided part with respect to the skid-sided part occurs, the skid attaching means comprising first lateral attaching means and second lateral attaching means;

the skid-sided part comprising a first lateral part extending longitudinally along a longitudinal axis, with the first lateral part being secured to the first lateral attaching means, and a second lateral part extending longitudinally along the longitudinal axis, with the second lateral part being secured to the second lateral attaching means;

the cross tube-sided part extending longitudinally along the longitudinal axis, with the cross tube-sided part being secured to the cross tube attaching means, the cross tube-sided part being located longitudinally between the first lateral part and the second lateral part.

19. The rotorcraft of claim 18, wherein the cross tube-sided part successively comprises, along the longitudinal direction, an annular first end body, an annular central body and an annular second end body, the annular first end body being arranged to fit the first lateral part forming a first slot, and the annular second end body being arranged to fit the second lateral part forming a second slot.

20. The rotorcraft of claim 19, wherein the first lateral part is annular and hollow and extends radially between a first lateral internal periphery and a first lateral external periphery, the first lateral internal periphery defining a first lateral cylindrical cavity, the longitudinal axis being the axis of symmetry of the first lateral cylindrical cavity, and the first lateral external periphery being secured to the first lateral attaching means, wherein the second lateral part is annular and hollow and extends radially between a second lateral internal periphery and a second lateral external periphery, the second lateral internal periphery defining a second lateral cylindrical cavity, the longitudinal axis being the axis of symmetry of the second lateral cylindrical cavity, and the second lateral external periphery being secured to the second lateral attaching means, wherein the cross tube-sided part is annular and hollow and extends radially between a central internal periphery and a central external periphery, the central internal periphery defining a central cylindrical cavity, the longitudinal axis being the axis of symmetry of the central cylindrical cavity, and the central external periphery being secured to the cross tube attaching means, the cross tube-sided part being located longitudinally between the first lateral annular hollow part and the second lateral annular hollow part, the first lateral annular hollow part and the cross tube-sided part being connected by means of the first bearing element located inside a first slot defined between the first lateral annular hollow part and the cross tube-sided part, and the second lateral annular hollow part and the cross tube-sided part being connected by means of the second bearing element located inside a second slot defined between the second lateral annular hollow part and the cross tube-sided part, and wherein the first lateral external periphery, the central external periphery of the annular central body and the second lateral external periphery are flush.

* * * * *